(12) United States Patent
Lin

(10) Patent No.: US 11,683,213 B2
(45) Date of Patent: Jun. 20, 2023

(54) AUTONOMOUS MANAGEMENT OF RESOURCES BY AN ADMINISTRATIVE NODE NETWORK

(71) Applicant: Infra FX, Inc., Palo Alto, CA (US)

(72) Inventor: Chris Lin, Palo Alto, CA (US)

(73) Assignee: Infra FX, Inc., Palo Alto, CA (US)

( * ) Notice: Subject to any disclaimer, the term of this patent is extended or adjusted under 35 U.S.C. 154(b) by 123 days.

(21) Appl. No.: 16/397,844

(22) Filed: Apr. 29, 2019

(65) Prior Publication Data

US 2019/0342143 A1 Nov. 7, 2019

Related U.S. Application Data

(60) Provisional application No. 62/665,223, filed on May 1, 2018.

(51) Int. Cl.
*H04L 41/042* (2022.01)
*H04L 41/00* (2022.01)
*H04L 67/1074* (2022.01)

(52) U.S. Cl.
CPC ............ *H04L 41/042* (2013.01); *H04L 41/30* (2013.01); *H04L 67/1076* (2013.01)

(58) Field of Classification Search
CPC .... H04L 41/042; H04L 41/30; H04L 67/1076
See application file for complete search history.

(56) References Cited

U.S. PATENT DOCUMENTS

| | | | | |
|---|---|---|---|---|
| 6,463,532 B1 * | 10/2002 | Reuter | ...................... | G06F 9/52 707/E17.007 |
| 6,748,381 B1 * | 6/2004 | Chao | ..................... | G06F 11/182 |
| 7,558,883 B1 * | 7/2009 | Lamport | ................ | G06F 11/142 709/248 |
| 8,694,639 B1 * | 4/2014 | Vermeulen | ............ | G06F 9/5011 709/226 |
| 8,813,225 B1 * | 8/2014 | Fuller | ..................... | H04L 67/16 726/23 |
| 9,852,221 B1 * | 12/2017 | Callau | ..................... | H04L 67/10 |
| 2002/0169986 A1 * | 11/2002 | Lortz | ...................... | H04L 63/08 726/4 |
| 2004/0254984 A1 * | 12/2004 | Dinker | .................... | H04L 69/40 709/205 |

(Continued)

OTHER PUBLICATIONS

Sukumar Yethadka, A Distributed Lock Manager Using Paxos: Design and Implementation of Warlock, a Consensus Based Lock Manager, Apr. 2013.

*Primary Examiner* — Mohamed A. Wasel
*Assistant Examiner* — Timothy Sowa
(74) *Attorney, Agent, or Firm* — Van Pelt, Yi & James LLP

(57) ABSTRACT

Autonomous management of resources by an administrative node network is disclosed, including: receiving, at a first node of a plurality of nodes associated with an administrative node network, a resource request directed to the administrative node network, wherein the administrative node network is associated with managing a set of resources; obtaining a first proposal with respect to the resource request; obtaining a second proposal with respect to the resource request from a second node of the plurality of nodes associated with the administrative node network; and determining a processing consensus associated with the resource request based at least in part on the first proposal and the second proposal.

20 Claims, 11 Drawing Sheets

(56) References Cited

U.S. PATENT DOCUMENTS

| | | | |
|---|---|---|---|
| 2006/0168011 A1* | 7/2006 | Lamport | G06F 11/1494 709/206 |
| 2007/0195810 A1* | 8/2007 | Fachan | H04L 67/1002 370/432 |
| 2007/0237078 A1* | 10/2007 | Hundscheidt | H04L 47/787 370/235 |
| 2008/0222154 A1* | 9/2008 | Harrington | G06F 16/1834 |
| 2010/0125670 A1* | 5/2010 | Dondeti | H04L 67/104 709/229 |
| 2012/0198037 A1* | 8/2012 | Shelby | H04W 4/70 709/223 |
| 2013/0159472 A1* | 6/2013 | Newton | H04L 69/22 709/219 |
| 2014/0173054 A1* | 6/2014 | Varney | H04L 41/509 709/219 |
| 2014/0173087 A1* | 6/2014 | Varney | H04L 61/2507 709/224 |
| 2014/0372491 A1* | 12/2014 | Ross | H04L 67/1097 707/822 |
| 2017/0118082 A1* | 4/2017 | Narayanan | H04L 45/122 |
| 2017/0149778 A1* | 5/2017 | Gill | H04L 63/0876 |
| 2017/0346830 A1* | 11/2017 | Goldfarb | H04L 63/102 |
| 2018/0255137 A1* | 9/2018 | Hu | H04L 67/1097 |
| 2018/0316676 A1* | 11/2018 | Gilpin | H04L 63/20 |
| 2019/0149410 A1* | 5/2019 | Araujo | H04L 63/20 709/220 |
| 2019/0279289 A1* | 9/2019 | Baluja | H04L 43/0876 |
| 2020/0090096 A1* | 3/2020 | Inokuchi | G06Q 10/06315 |

* cited by examiner

|  | Application 1 | Application 2 | Application 3 |
|---|---|---|---|
| Roles | App1 admin, role 1, role 2, role 3 | App2 admin, role 4, role 5, role 6, role 7 | App3 admin, role 8, role 9, role 10 |
| User 1 | Role 1, Role 3 | App2 admin |  |
| User 2 | Role 2 | Role 4 | App3 admin |
| User 3 |  | Role 7 | Role 8 |
| User 4 | App1 admin role | App2 admin, role 6 | Role 9, Role 10 |

FIG. 10

|  | Application 1 | Application 2 | Application 3 |
|---|---|---|---|
| Roles | App1 admin, role 1, role 2, role 3 | App2 admin, role 4, role 5, role 6, role 7 | App3 admin, role 8, role 9, role 10 |
| Recipes | Admin-privileges and various privileges | Admin-privileges and various privileges | Admin-privileges and various privileges |
| User 1 | User1-App1 Key | User1-App2 Key | |
| User 2 | User2-App1 Key | User2-App2 Key | User2-App3 Key |
| User 3 | | User3-App2 Key | User3-App3 Key |
| User 4 | User4-App1 Key | User4-App2 Key 1, User4-App2 Key 2 | User4-App3 Key |

AUTONOMOUS MANAGEMENT OF RESOURCES BY AN ADMINISTRATIVE NODE NETWORK

CROSS REFERENCE TO OTHER APPLICATIONS

This application claims priority to U.S. Provisional Patent Application No. 62/665,223 entitled AUTONOMOUS MANAGEMENT MECHANISM OF DISTRIBUTED COMPUTING SYSTEMS filed May 1, 2018 which is incorporated herein by reference for all purposes.

BACKGROUND OF THE INVENTION

A conventional approach to managing underlying computing resources is through an administrative system in a centralized way. For example, a centralized administrative system is conventionally configured to manage a corresponding set of computing resources. As such, a centralized administrative system conventionally deterministically manages its mapped-to underlying computing resources. However, a deterministic and static mapping between a centralized administrative system and its underlying resources is inflexible and also problematic if the centralized administrative system becomes compromised or otherwise unavailable.

BRIEF DESCRIPTION OF THE DRAWINGS

Various embodiments of the invention are disclosed in the following detailed description and the accompanying drawings.

FIG. 10 is a diagram showing an example table of mapping each user to a role in an application and a corresponding set of accesses associated with that role.

FIG. 11 is a diagram showing an example table of mapping each user to a particular key to be used in each application, where each key is associated with a limited set of access privileges.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, virtual computing resources, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
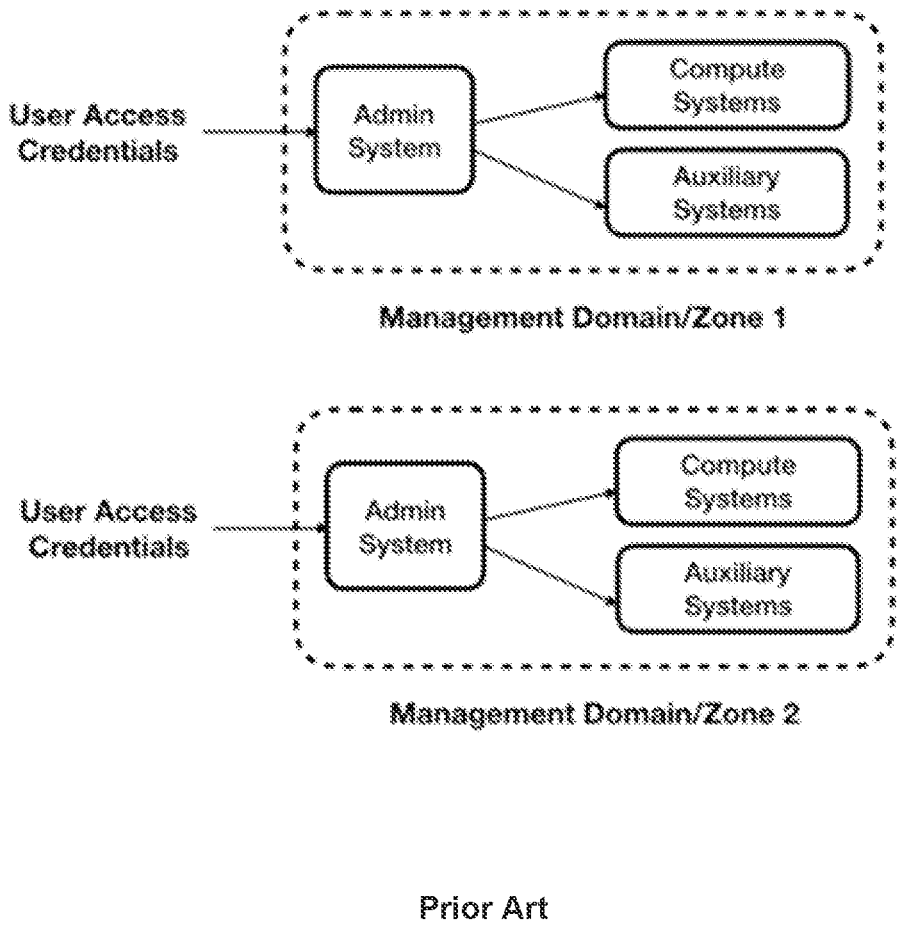
FIG. 1 is a diagram showing an example of a conventional deterministic and centralized approach to resource management.

FIG. 1 is a diagram showing an example of a conventional deterministic and centralized approach to resource management. The example in FIG. 1 shows two management domains that are respectively referred to as "Zone 1" and "Zone 2." In each of "Zone 1" and "Zone 2," a corresponding centralized administrative system ("Admin System") manages a corresponding set of computing resources ("compute systems" and "auxiliary systems"). For example, such centralized administrative systems could be implemented by system management products (e.g., system management software such as Microsoft® system center, VMware® vCenter, etc.), configuration management and orchestration products, or cloud resource management products (e.g., cloud comping platforms such as Openstack®, vendor-specific clouds) for their corresponding underlying computing resources. System administrators typically use their credentials to access a centralized administrative system, which in turn has direct control over the corresponding underlying compute systems and auxiliary systems assigned to the particular centralized administrative system for the managed domain/zone. The centralized administrative system will follow the commands and scripts from system administrators to manage the underlying systems in a deterministic way. If system administrators need to manage different underlying compute and/or auxiliary systems, the administrators would access a different administrative system for each corresponding underlying system. Put another way, if a system administrator needed to access multiple underlying compute and/or auxiliary systems, then the system administrator would need to maintain a separate set of credentials for each such underlying system. The single-sign-on approach is a special example where the system administrator would maintain the integration of central credentials with credentials of administrative systems for each such underlying system.

However, a conventional approach such as shown in FIG. 1, in which one centralized administrative system manages one set of computing resources, suffers when the centralized administrative system becomes compromised or unavailable. To overcome the weakness of having only one centralized administrative system manage one set of computing resources, another conventional approach utilizes a cluster of multiple administrative systems that are configured to manage one set of computing resources. In the cluster setup, at any one time, a single system of the cluster administrative systems would be designated as the "master" administrative system that is in charge of the management of the set of computing resources. As such, the master administrative system is configured to respond to all requests for resources that are directed to the cluster of administrative systems. When the currently designated master administrative becomes unavailable, another administrative system from the same cluster is then selected to serve as the new master administrative system. Typically, the administrative systems of the cluster are redundantly configured such that each such system would handle a request for resources in the same manner. As a result, even though new master administrative systems can be selected from the cluster, as needed, there is little room to optimize the way in which the requests are serviced by the cluster. Furthermore, if the master administrative system becomes compromised by a malicious party and the compromise is not discovered, the master administrative system may fail to manage the underlying computing resources in a desired manner.

Embodiments of autonomous management of resources by an administrative node network are described herein. A resource request, which is directed to an administrative node network, is received at a plurality of nodes that is associated with the administrative node network. The administrative node network is configured to manage a set of resources. In various embodiments, the resource request is configured to request a specified use of at least a subset of the set of resources. Each node within the administrative node network may evaluate the resource request, generate proposals, and share with other nodes in the administrative node network. For example, it is obtained, at the first node, a first proposal with respect to the resource request. A second proposal with respect to the resource request is obtained from a second node of the plurality of nodes associated with the administrative node network. A processing consensus associated with the resource request is determined based at least in part on the first proposal and the second proposal. More proposals can be obtained from other nodes to determine the processing consensus, in general.

Figure 2:
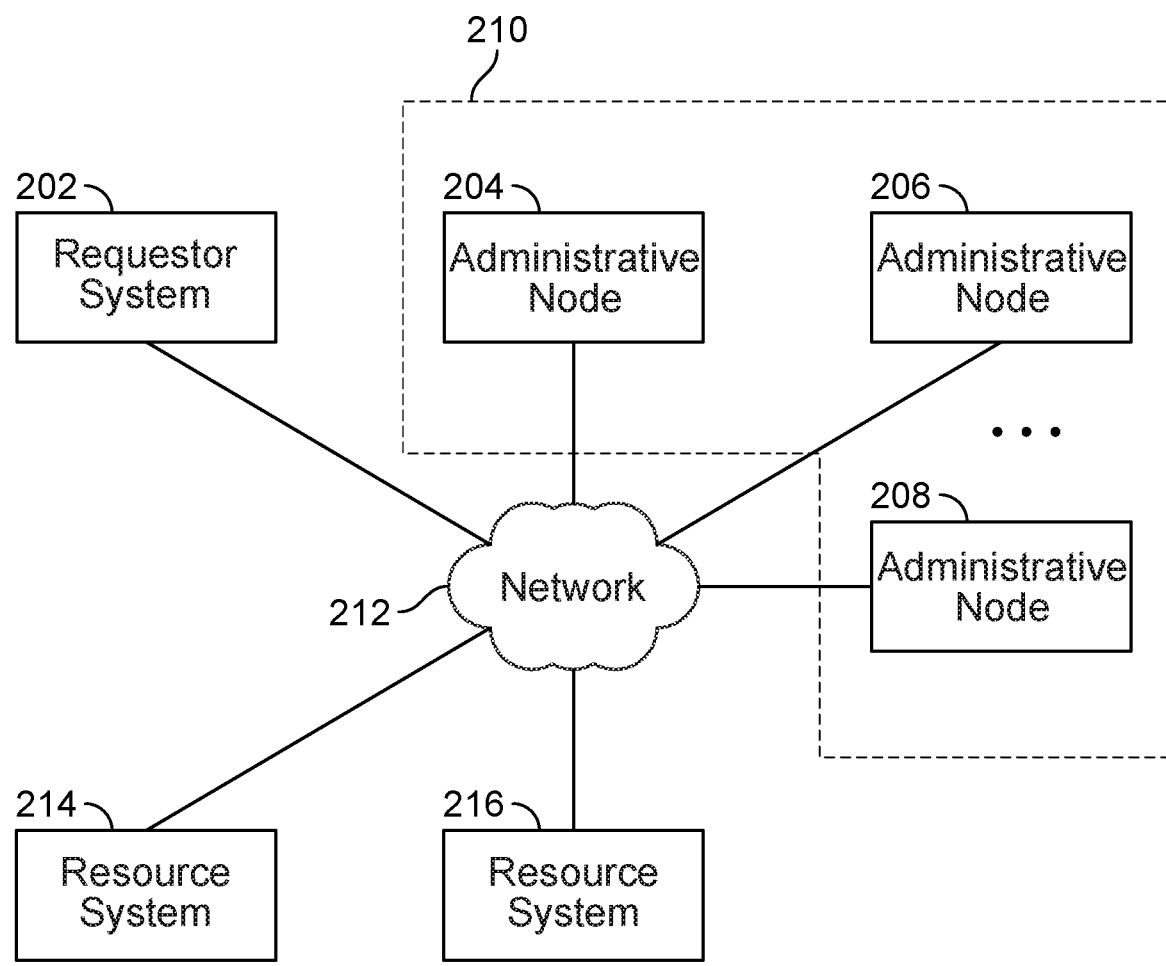
FIG. 2 is a diagram showing an embodiment of a system of autonomous management of resources by an administrative node network.

FIG. 2 is a diagram showing an embodiment of a system of autonomous management of resources by an administrative node network. In the example of FIG. 2, administrative node network 210 comprises at least administrative node 204, administrative node 206, and administrative node 208. The administrative nodes of administrative node network 210 comprise loosely-coupled nodes in a network that are configured to autonomously manage a set of resources. For example, autonomously managing the set of resources includes collectively agreeing on how to process the resource request. The set of resources may encompass computing resources such as, for example, a virtual machine or a physical machine with CPU, memory, network bandwidth and storage, or it could be a compute engine that can run scripts and codes. The set of resources may encompass network services such as, for example, a network, a firewall, access functions such that servers can be accessed directly over the network with different control, external network storage that compute systems can access, external monitoring systems for servers, and/or physical management systems for servers (e.g., network-controlled power switch relay). The set of resources may also encompass virtual resources such as license rights and policies. The resources that can be managed that are described herein are examples and any appropriate resource can be managed by an administrative node network. As shown in FIG. 2, at least a portion of the set of resources that is managed by administrative node network 210 may be provided or otherwise associated with resource system 214 and resource system 216.

Additional resources can be added to the set of resources that is managed by administrative node network 210. In various embodiments, a bootstrap process is used to establish trust and access rights between administrative node network 210 and the newly joined resource (e.g., a new resource system). This can be done, for example, through installing computer codes on the new resource system or be done through establishing administrator rights with a cryptographic approach. Once the bootstrap is done, the newly joined resource system can be controlled by administrative node network 210.

Administrative node 204, administrative node 206, and administrative node 208 of administrative node network 210 may be located in the same or different geographic areas. All of the administrative nodes of administrative node network 210 may be operated by the same party or at least two administrative nodes of administrative node network 210 may be operated by different parties. In administrative node network 210, the number of administrative nodes and can expand and shrink freely as the management needs of the set of resources varies. In various embodiments, a new administrative node that joins administrative node network 210 is configured to receive a bootstrap program associated with administrative node network 210 and also establish trust (e.g., via an exchange of encryption keys) with the existing administrative nodes of administrative node network 210.

Administrative node network 210 is configured to perform management functions with respect to the set of resources such as, for example, changing or otherwise engaging the managed set of resources in response to resource requests that are received at administrative node network 210 over network 212 (e.g., a high-speed data and/or telecommunications network). In various embodiments, a "resource request" comprises a request to use and/or perform a set of actions on at least a subset of the set of resources that is managed by the administrative node network to which the request was sent. For example, the origin of a resource request may originate from a user (e.g., an application executing at requestor system 202) or by an autonomous system, including a managed resource (e.g., resource system 214 or resource system 216). For example, if resource system 214 had been assigned by administrative node network 210 to a requestor and its storage is almost full or its CPU overloaded, resource system 214 could trigger a monitoring alert, which could in turn trigger a new resource request to be sent to administrative node network 210 to add capacity or upgrade resource system 214.

Each administrative node of administrative node network 210 that is configured to participate in the processing of a received resource request is configured to use locally stored decision logic that is applicable to that resource request to independently generate a proposal (e.g., decision) with respect on how to process the resource request. In various embodiments, in addition to using the locally stored decision logic, each administrative node that received the resource request is configured to use (at least) stored current resource state information associated with the set of resources that is managed by administrative node network 210 to generate the proposal for handling the resource request. In various embodiments, the "current resource state information" associated with the set of resources that is managed by an administrative node network is maintained by each administrative node of the network and tracks the current state (e.g., current availability, the current assignments) of the set of resources and/or historical usages of the set of resources. In some embodiments, other factors that can influence how an administrative node generates a proposal for a resource request include smart contracts associated with requestors and also concurrent other resource request(s). In some embodiments, different administrative nodes within the same administrative node network may be configured to use different decision logic with respect to the same resource request and may, therefore, independently generate different proposals for that resource request. After an administrative node generates its own proposal with respect to a resource request, the administrative node will broadcast the proposal to each of the other administrative nodes in administrative node network 210 that is participating in processing the resource request. All the participating administrative nodes will evaluate the proposals with respect to the resource request using the same consensus protocol to arrive at an agreed-upon "processing consensus" with respect to the resource request. In various embodiments, a "consensus protocol" refers to a set of criteria against which to evaluate proposal(s) and determine a consensus or conclusion based on the proposals, where the processing consensus decision is to be accepted by each participating administrative node. For example, a consensus protocol may select one proposal, based on a particular metric of the proposal, to use as the processing consensus for the resource request by the entire administrative node network. Another consensus protocol may include a "proof of work" function such that the proposal generated by the first administrative node that generates the correct answer to a provided proof of work challenge is adopted as the processing consensus by the entire administrative node network. In some embodiments, the consensus protocol that is used to evaluate proposals with respect to a resource request may depend on an attribute of the resource request (e.g., the type of the resource request) and/or an attribute of the managed set of resources (e.g., the type(s) of the resources that are managed). While at least some of the administrative nodes may have used different decision logic to generate their respective proposals for the same resource request, all the administrative nodes will adopt the same consensus protocol to evaluate the proposals for that resource request.

After the participating administrative nodes of administrative node network 210 determine a processing consensus with respect to a resource request, a new record that documents the resource request and its processing consensus (e.g., changes to be made to the managed set of resources) is generated at each of the participating administrative nodes. If the processing consensus indicated to execute the resource request, then administrative node network 210 proceeds to execute the resource request. After the execution of the resource request, each administrative node of administrative node network 210 is configured to update its locally stored current resource state information to, for example, reflect the new/updated state of the managed set of resources after the execution of the resource request.

A resource request that is directed to administrative node network 210 is received at each administrative node of administrative node network 210. In some embodiments, a resource request to administrative node network 210 is received at a website associated with administrative node network 210 and distributed by the web server (not shown in FIG. 2) that operates the website to each administrative node of administrative node network 210. In some embodiments, a resource request to administrative node network 210 is received at one administrative node of administrative node network 210 and is broadcasted to each listening administrative node of administrative node network 210. In actual practice, the administrative nodes of administrative node network 210 may each receive a resource request that is directed to administrative node network 210 in any appropriate manner.

In some embodiments, the administrative nodes of administrative node network 210 may be partitioned into two or more sub-groups, where the member administrative nodes of each sub-group may be configured to process different types of resource requests or perform a different function associated with the same resource request. For example, not all resource requests need to be handled by every administrative node of administrative node network 210. Instead, in some embodiments, the resource requests and administrative node network 210 may be partitioned based on the interests of the administrative nodes. For example, by dividing administrative node network 210 into multiple sub-groups of administrative nodes, each sub-group can process a different resource request, thereby enabling concurrent processing of resource request at administrative node network 210. This allows administrative node network 210 to scale in a dynamic way. In some embodiments, a queue of resource requests may be maintained by administrative node network 210 such that those resource requests in the queue that can be concurrently processed by the network is processed at each time that the network has capacity to process additional requests. The concept of memberships can be further extended to form subsets of administrative nodes or to build hierarchy/relationships between the memberships. For example, there could be a membership for observer-only administrative nodes, which will replicate and record information made by the active-decision members of the administrative nodes. Just like there is no need for a fixed number of administrative node in administrative network 210, in some embodiments, the administrative nodes need not stay with fixed memberships either.

As shown in FIG. 2, the administrative node network, in accordance to various embodiments described herein, no longer need a master node among the administrative nodes. In contrast, the administrative nodes in the node network work in concert to arrive at an agreed-upon decision that is accepted by the entire node network. New administrative nodes may be added to the node network and existing administrative nodes in the node network may be removed, depending on the management needs of the set of resources. The elastic nature of the node membership in the administrative node network provides a flexible arrangement of nodes that can be used to perform resource management functions. Furthermore, because each administrative node independently generates a proposal for a resource request and the proposals from multiple administrative nodes are evaluated based on a consensus protocol, there is high reliability and integrity to the consensus decisions that are determined by the node network as a single compromised node is unlikely to detrimentally affect the consensus made by the entire node network. Additionally, security is added to the communication among administrative nodes and between administrative nodes and a requestor or resource system based on the use of cryptography.

The following is an example way in which a network of administrative nodes such as administrative node network 210 can be used to manage resources: A portion of a graphic processor unit (GPU) farm is assigned by the GPU farm administrator to be autonomously managed by an administrative node network. In addition to adding the designated portion of the GPU farm under the management of the administrative node network, the GPU farm administrator may also provide the administrative node network other information such as, for example, smart contracts that define various users' permitted use of the GPU resources. A smart contract is a computer protocol intended to digitally facilitate, verify, or enforce the negotiation or performance of a contract between different parties (e.g., a GPU farm operator and a GPU resource user). While the portion of the GPU farm is under management by the administrative node network, the GPU farm administrator does not need to manually interfere or oversee the management of those GPU resources in response to requestors of those resources. For example, a requestor may request to use a certain amount of GPU resources to use to render computer generated graphics. In response to such a resource request, each administrative node of the network is configured to use (at least) its locally stored decision logic, the current resource state (e.g., how much of the GPU resources are used and how much are available, how much has the requestor been previously been assigned GPU resources) of the portion of the GPU farm, and a smart contract between the requestor and the GPU farm operator to determine an independent proposal on how to process the resource request. The proposals that are independently generated by the respective administrative nodes of the network are then evaluated based on a consensus protocol that is appropriate for the given resource request and an agreed-upon processing consensus associated with the resource request is determined. Each administrative node would then record the agreed-upon processing consensus associated with the resource request and the resource request would be handled according to the processing consensus. If the processing consensus were to deny the resource request (e.g., because the requestor is attempting to use more GPU resources than the smart contract to which it is a party permits), then the resource request is denied and a corresponding message may be sent back to the requestor. If the processing consensus were to grant the resource request, then the processing consensus would be executed (e.g., access information to the requested GPU resources would be determined and sent back to the requestor) and the current resource state information stored at each administrative node would be updated based on the GPU resources that were used (e.g., allocated or assigned to the requestor) as a result of granting the resource request.

Figure 3:
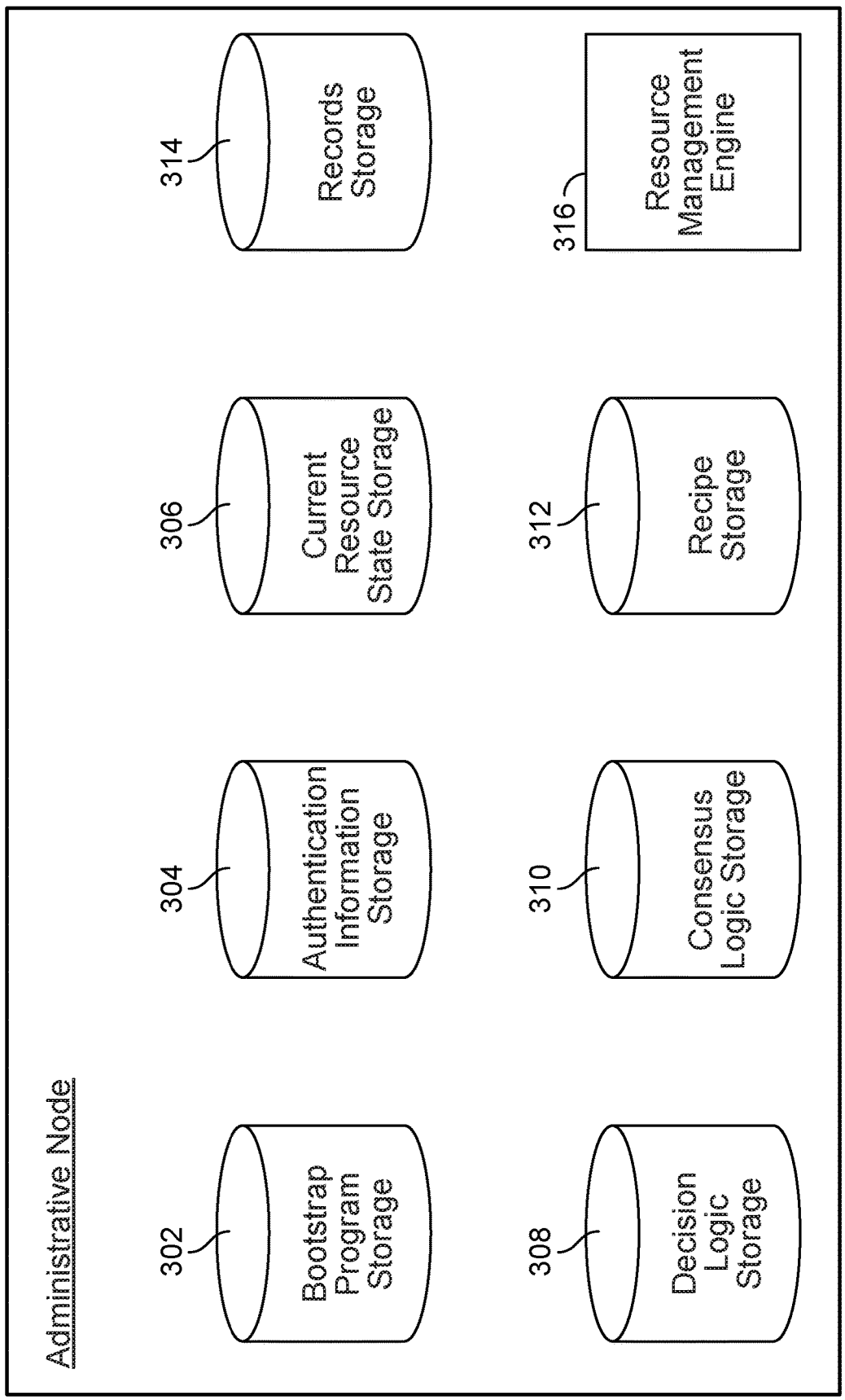
FIG. 3 is a diagram showing an example of an administrative node.

FIG. 3 is a diagram showing an example of an administrative node. In some embodiments, administrative node 204, administrative node 206, and administrative node 208 of FIG. 2 may each be implemented with the example of FIG. 3. The example administrative node of FIG. 2 includes: bootstrap program storage 302, authentication information storage 304, current resources stage storage 306, records storage 314, decision logic storage 308, consensus logic storage 310, recipe storage 312, and resource management engine 316. Each of the bootstrap program storage 302, authentication information storage 304, current resource state storage 306, records storage 314, decision logic storage 308, consensus logic storage 310, and recipe storage 312 may be implemented using volatile or non-volatile storage. Resource management engine is configured to be implemented using hardware and/or software.

Bootstrap program storage 302 is configured to store bootstrap computer code. In some embodiments, the bootstrap computer code comprises computer code that is needed for the administrative node to perform management functions associated with an administrative node network. In some embodiments, the bootstrap computer code comprises computer code that is needed for the administrative node to establish management functions over a particular resource. In some embodiments, the bootstrap computer code that is stored at bootstrap program storage 302 is received at the administrative node during one or more bootstrap processes.

Authentication information storage 304 is configured to store credentials and/or other types of authentication information. In some embodiments, authentication information storage 304 stores credentials associated with each administrative node in the administrative node network. For example, the credentials may include a public key associated with each administrative node in the network and additionally, a private key associated with the administrative node with which authentication information storage 304 is associated. For example, credentials associated with administrative nodes may be used by administrative nodes to authenticate messages (e.g., proposals with respect to resource requests) that are sent among administrative nodes. In some embodiments, authentication information storage 304 stores credentials to be used with the resource systems that are managed by the administrative node network. For example, credentials to be used with the resource systems can be used to have messages (e.g., resource request processing execution instructions or queries of current status) that are sent by the administrative node be authenticated at the resource systems. In some embodiments, authentication information storage 304 stores credentials associated with requestors. For example, credentials associated with requestors may be used by administrative nodes to authenticate resource requests that are received from requestors. In some embodiments, authentication information storage 304 is configured to store credentials that are associated with one or more recipes that are stored in recipe storage 312, which will be described in further detail below.

In some embodiments, to establish trusts and protection, in various embodiments, the management of resources can leverage cryptography. Incoming requests or messages to the administrative node network can be encrypted with proper security keys and/or signed with cryptographic signature to validate the authenticity of the message itself and the source of the message. As mentioned above, the communications between the administrative nodes in the administrative node network can also be encrypted and signed by individual nodes. The communications between the administrative nodes and the underlying managed resources can also be encrypted and signed by the communicating parties. The agreed-upon processing consensus (management decisions) can be signed with multiple signatures of participating nodes and/or can be added to a chain of cryptographically signed blocks. Any parties within the administrative node network can also communicate privately with proper key exchanges and cryptography protections.

Current resource state storage 306 is configured to store state information associated with the set of resources that is managed by the administrative node and/or state information associated with requestors that request usage of the set of resources. In some embodiments, current resource state storage 306 is configured to store the current availability of the managed set of resources. For example, the current availability of the managed set of resources may include one or more of the following: how much each of the resource is used or is free, which resource and in which amount is assigned to which requestor, and the current settings associated with each resource. In some embodiments, current resource state storage 306 is configured to store the historical usage of the managed set of resources by one or more requestors. For example, current resource state storage 306 may keep track of how much each requestor has historically used or requested to use each of one or more resources. In some embodiments, the content of current resource state storage 306 is updated by resource management engine 316 via querying the managed resources and/or receiving reports from the managed resources. In some embodiments, the content of current resource state storage 306 is updated by resource management engine 316 after a resource request is executed by resource management engine 316.

Resource management engine 316 is configured to respond to resource requests that are received at the administrative node. A resource request may request to use a particular resource or a set of resources and/or perform one or more actions to one or more resources that are managed by the administrative node network. In response to receiving a new resource request, in some embodiments, resource management engine 316 is configured to determine whether the requestor from which the resource request had originated is entitled to make the resource request. For example, resource management engine 316 is configured to determine whether the requestor is entitled to make the resource request based on whether a relevant smart contract (e.g., that may be stored at the administrative node and/or otherwise accessible to resource management engine 316) to which the requestor is a party permits the requestor to use the requested resources. In another example, resource management engine 316 is configured to determine whether the requestor has the credits and/or rights that are needed to make the resource request (e.g., by querying a database or other entity that manages the credits and/or rights of users). In the event that resource management engine 316 determines that the requestor is not entitled to make the resource request, resource management engine 316 proceeds to generate a proposal that denies the request. Otherwise, in the event that resource management engine 316 determines that the requestor is entitled to make the resource request, resource management engine 316 proceeds to use at least decision logic stored in decision logic storage 308 and the current resource state information stored at current resource state storage 306 to generate a proposal that grants the request and may, additionally, include a particular execution of the request. In some embodiments, different decision logic stored at decision logic storage 308 may be used to generate a proposal for different resource requests, depending on an attribute associated with the resource requests or an attribute associated with the requestor, for example. Resource management engine 316 is configured to send out the proposal to each other administrative node of the network that is participating in processing the resource request. Resource management engine 316 is configured to receive a corresponding proposal for handling the resource request from each other administrative node that is participating in processing the resource request.

Resource management engine 316 is configured to use consensus logic (e.g., a consensus protocol) that is stored at consensus logic storage 310 to evaluate all the proposals, including the proposal that was generated locally and the proposals that were received from different administrative nodes based on the consensus logic to determine a processing consensus, which is an administrative node network-wide agreed-upon decision on how to process the resource request. Various different consensus protocols can be used to determine the processing consensus for a resource request. For example, the applicable consensus protocol for handling a resource request may depend on an attribute associated with the resource requests, an attribute associated with the requestor, or another factor. While different administrative nodes may use different decision logic to independently generate a proposal for one resource request, all the administrative nodes will apply the same consensus protocol to the proposals to determine a processing consensus with respect to the resource request. In some embodiments, a consensus protocol may award the administrative node a reward (e.g., a credit) if that administrative node's proposal is selected (e.g., based on the evaluation criteria associated with the protocol) out of all the proposals, which may incentivize the administrator of each administrative node to generate more optimal decision logic so as to improve the chances that proposals that are generated by that node are selected.

After resource management engine 316 determines the processing consensus for a resource request, resource management engine 316 is configured to generate a new record that documents the resource request and its corresponding processing consensus (i.e., how that the resource request will be/has been handled). For example, the new record may include the changes that are caused by the processing consensus to the managed set of resources. In various embodiments, the new record is stored at records storage 314 and may be linked to the immediately previously record, if one exists. In some embodiments, the chain of records of resource request processing consensus may be implemented using a blockchain. The chain of records that is stored a particular administrative node form an audit trail of at least all the resource request processing that the local administrative node has participated.

In the event that a resource request is determined by the processing consensus to be granted, in some embodiments, resource management engine 316 is configured to check recipe storage 312 for whether a relevant recipe for executing the resource request exists. In various embodiments, a "recipe" defines steps and actions to be taken with respect one or more resources. A recipe may comprise scripts and/or other types of computer code. In some embodiments, recipes may be registered in recipes storage 312. These recipes may correspond to management of particular subsystems or may be defined by known requestors, for example. The recipes can define procedures and conditions for individual administrative nodes or a collection of administrative nodes to execute in autonomous way, or can be triggered by sending in the matching requests (likely with verification steps such as proper signatures, for example). The registration can occur as new participating users and resources join the administrative node network and/or can be added or updated afterwards. In some embodiments, recipes comprise deployment scripts for a new application deployment, failover scripts for application failover, upgrade scripts for application version upgrade, or more complicated orchestrated programs that handle larger systems in a programmatic way. As shown in FIG. 3, recipes can be stored at one or more administrative nodes. In this approach, as new administrative nodes join the administrative node network, they can download and configure the recipes that are stored at the network as part of the bootstrap. In some embodiments, in addition to be stored at one or more administrative nodes, recipes can be stored in many other ways. For example, recipes can also be stored in the underlying managed set of resources with sufficient redundancy/replications controlled by the administrative node network. In this scenario, as new administrative nodes join the network, they will receive network access to these store locations as part of a bootstrap process. In some embodiments, at least some of the recipes that are stored in recipes storage 312 are mapped to one or more authorized keys for specific executions that are related to the resource request to which the recipe is related. In some embodiments, the resource request may include identifying information and verification information (e.g., a signature that is generated based on a key) that is provided by the requestor that had sent the request. The key may correspond to a limited set of rights to access one or more resources (e.g., control systems), which will enable to a recipe that corresponds to the request to execute.

Figure 4:
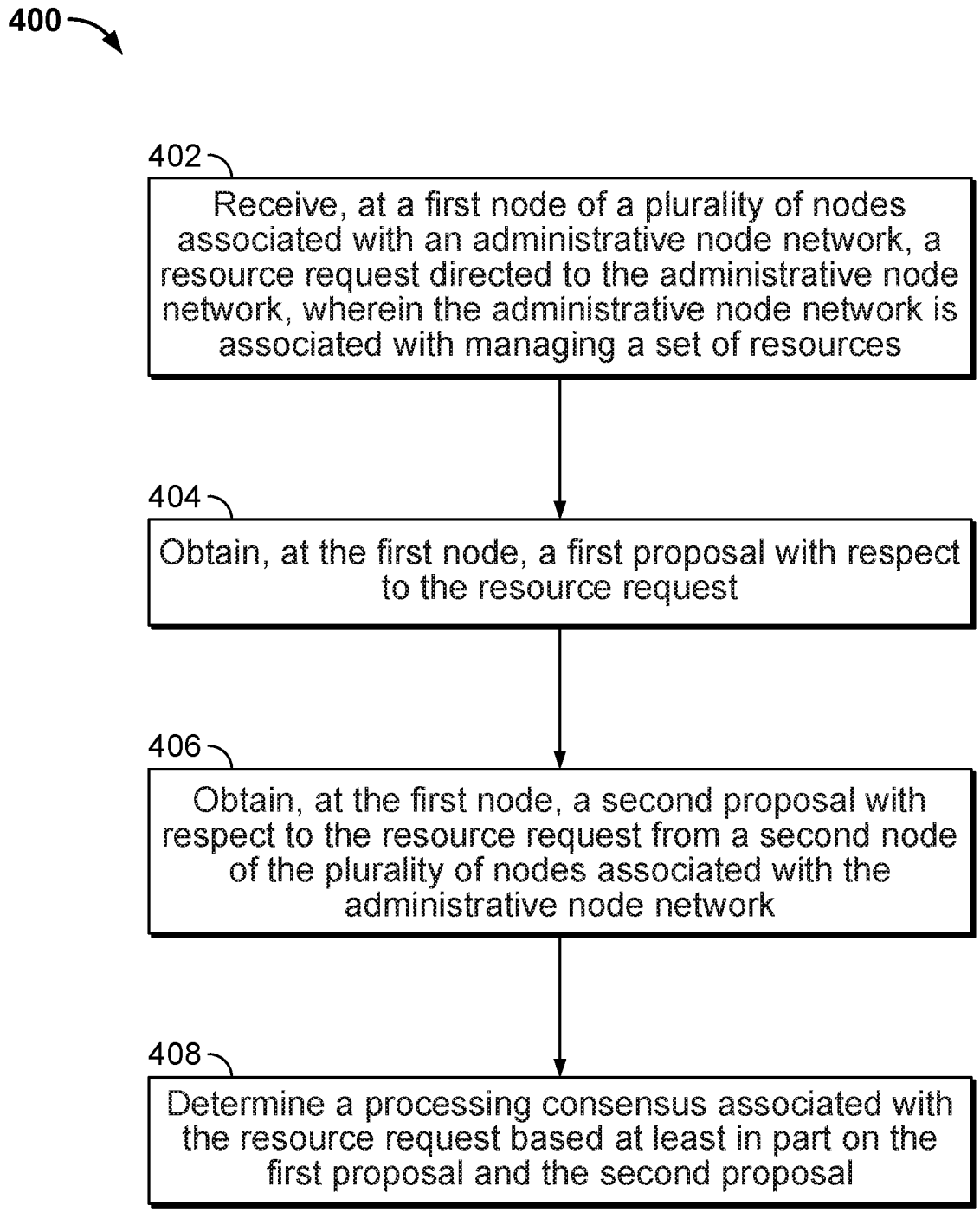
FIG. 4 is a flow diagram showing an embodiment of a process for autonomous management of resources by an administrative node in an administrative node network.

FIG. 4 is a flow diagram showing an embodiment of a process for autonomous management of resources by an administrative node in an administrative node network. In some embodiments, process 400 is implemented at each of one or more of the administrative nodes (e.g., administrative node 204, administrative node 206, and administrative node 208) of administrative node network 210 of FIG. 2.

At 402, a resource request directed to an administrative node network is received at a first node of a plurality of nodes associated with the administrative node network, wherein the administrative node network is associated with managing a set of resources. The administrative node network is assigned to manage a set of resources. For example, the set of resources comprises computing resources. The resource request includes data that describes a request to use or perform an action at the set of resources. In some embodiments, the resource request is sent to a website associated with the administrative node network and the web server associated with the website forwards the resource request to each of the administrative nodes in the network. In some embodiments, the resource request is sent to one administrative node and that administrative node sends copies of the request to each other administrative node in the network. In some embodiments, the resource request is broadcasted to all listening administrative nodes in the network.

At 404, a first proposal with respect to the resource request is obtained at the first node. Each administrative node that participates in processing the resource request is configured to generate a proposal for processing the resource request using locally stored decision logic (e.g., protocol). The proposal may dictate whether to grant and therefore, execute the resource request and if so, how. The proposal may also be generated based on the current resource state information associated with the managed set of resources. In some embodiments, if there are one or more competing resource requests (e.g., resource requests that request for the use of the same resources), the proposal generated for each such resource request may also consider the other competing resource requests.

At 406, a second proposal with respect to the resource request from a second node of the plurality of nodes associated with the administrative node network is received at the first node. More proposals can be obtained from other nodes and used to determine the processing consensus, in general. In addition to generating its own proposal, each administrative node that participates in processing the resource request is configured to receive a proposal for handling the request that had been generated by another administrative node. Because, generally, a resource request, if granted, may be executed in different ways, each proposal may present a different manner of executing the request.

At 408, a processing consensus associated with the resource request is determined based at least in part on the first proposal and the second proposal. The multiple (e.g., two or more) proposals are evaluated based one on a relevant consensus protocol to determine one of the proposals to use as the agreed-upon decision (the "processing consensus"). The processing consensus may indicate to grant the resource request and also, how the resource request is to be executed. Alternatively, the processing consensus may deny the resource request. For example, the consensus protocol may score each proposal using a set of criteria that is specific to that particular consensus protocol and then select one of the proposals based on their respective scores. Once the processing consensus is decided, each participating administrative node generates a new record that documents the resource request, the processing consensus, and/or the updated state of the managed set of resources.

While various examples described herein indicate that at least two proposals are generated for a resource request, in some instances, only one proposal may be generated for a resource request. For example, only one proposal may be generated by an administrative node in the event that other administrative nodes have not yet joined the node network and/or other administrative nodes are temporarily unavailable. One proposal may still be evaluated by a relevant consensus protocol to generate a processing consensus for the resource request. As such, the consensus protocol that is used may be selected to cover edge/corner scenarios such as, for example, when there is only one proposal that is generated for a resource request.

In a first example of how the administrative nodes of an administrative node network may work together to satisfy a received resource request, each administrative node can calculate performance data and network performance as new resources (e.g., compute/auxiliary systems) joins the distributed network, and keep scores of its nearby compute/auxiliary systems. When an incoming resource request for deploying a new application with a required resources specification arrives, the administrative nodes in the network may each examine its known computing/auxiliary systems and use the best known scoring systems as the proposed deployment. The administrative nodes then share with each other the individual proposals, reach a processing consensus on which proposal to move forward, go ahead with deployment, and record the decision with multiple administrative nodes to reflect the corresponding computing/auxiliary system resource change in a consistent way.

In a second example of how the administrative nodes of an administrative node network may work together to satisfy a received resource request, when an incoming request of adding a failover/redundancy of existing application deployment is received, the administrative nodes in the administrative node network may each examine its known underlying resource systems, and calculate a proposal using decision logic based on a known state of underlying resource systems. Each administrative node may then share its proposal with other administrative nodes. The administrative nodes that already know where the previous deployments with recorded data are made can further calculate the score of the new proposals, use that information to further determine the quality of proposals, and then reach consensus on the decision. The administrative nodes can then execute the decision by deploying the redundant application to the targeted compute/auxiliary systems, update configuration changes of compute/auxiliary systems in the previous application deployment as necessary (to start data replication, for example), and record the new state of the primary-failover application deployment and the related changes of the compute/auxiliary systems.

Unlike the conventional centralized approach, in an administrative node network, there are no fixed administrative systems managing pre-allocated computing resources. Instead, there is a network of participating administrative nodes, which may change from time to time. New administrative nodes may be added to the network through a bootstrap process in which trust is established (e.g., through the exchange of public keys) among the new and existing nodes of the network. Existing administrative nodes may also leave the network without degrading the integrity of the administrative functions of the network as long the consensus protocols can still be supported by the remaining administrative functions. The consensus protocol(s) used by the network can also incentivize the decision logic of administrative nodes to be optimized over time so the administrative node(s) that generate the proposals that become the agreed-upon consensus may obtain more rewards.

Also, in the administrative node network model, system administrations are no longer centralized to the specific administrative systems assigned to the managed domains. System administration in such an administrative node network computing environment goes through a consensus process of all participating administrative nodes before it is decided and registered for execution. Furthermore, the consensus logic to be used to handling resource requests can be selected to ignore or not choose proposals that may be generated by one or more compromised administrative nodes.

Figure 5:
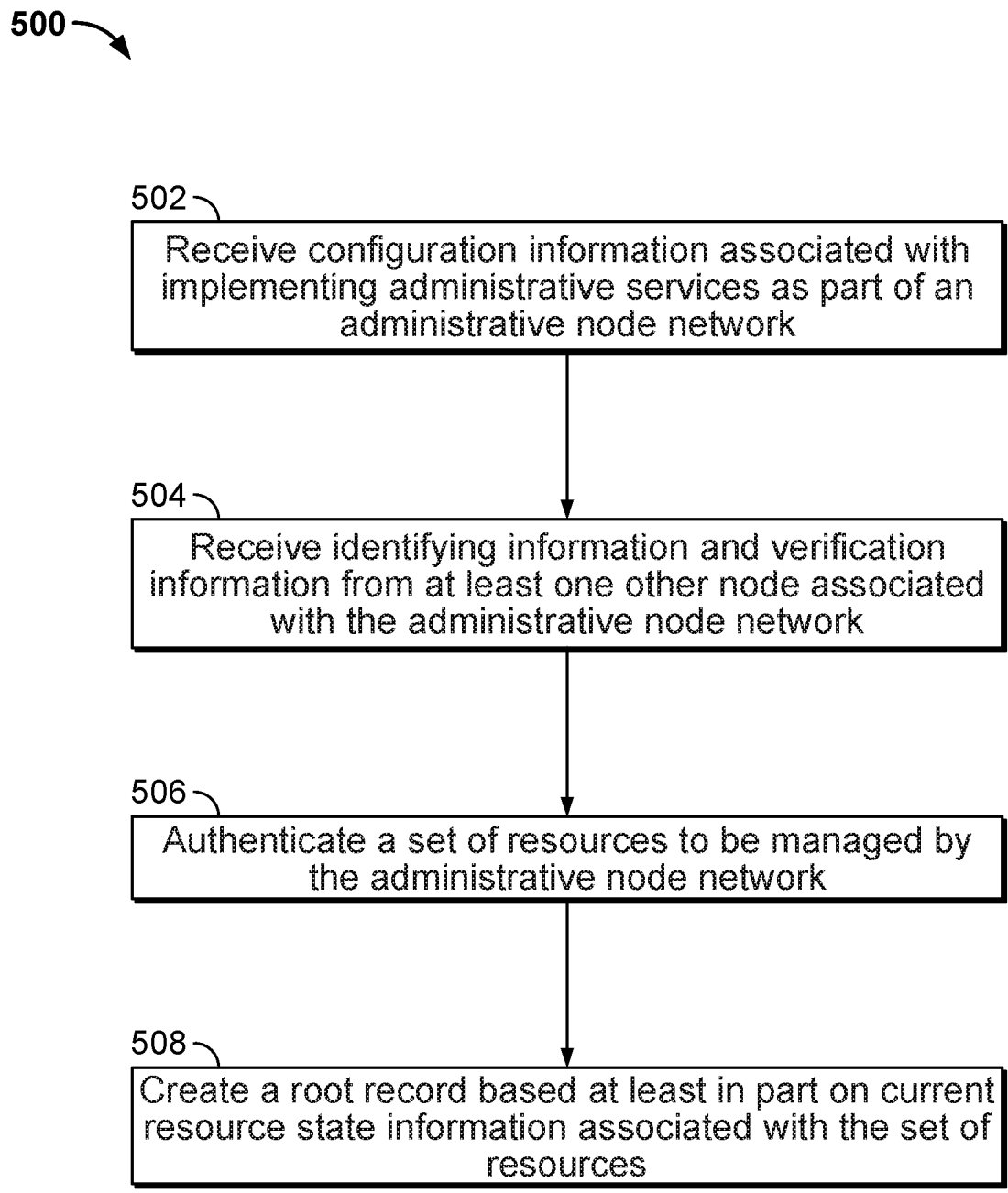
FIG. 5 is a flow diagram showing an example of a process for initializing an administrative node in an administrative node network.

FIG. 5 is a flow diagram showing an example of a process for initializing an administrative node in an administrative node network. In some embodiments, process 500 is implemented at each of one or more of the administrative nodes (e.g., administrative node 204, administrative node 206, and administrative node 208) of administrative node network 210 of FIG. 2.

Process 500 is an example describing various steps that may be performed by an administrative node that is used to seed an administrative node network.

At 502, configuration information associated with implementing administrative services as part of an administrative node network is received. In some embodiments, there is a genesis administrative node or a set of genesis administrative nodes that is directly deployed to seed an administrative node network. These genesis node(s) already have the proper computer codes and configurations for data replications and peer network communication, for example. In some embodiments, new administrative nodes that choose to join the particular administrative node network will receive configuration instructions, through executing installation code for the particular administrative node network, for example, during a bootstrap process. For example, these configuration instructions can be downloaded from a website or from the administrative node network.

At 504, identifying information and verification information are received from at least one other node associated with the administrative node network. In some embodiments, at least identifying information from each existing administrative node is sent to a new administrative node. In some embodiments, each administrative node is configured with a pair including a private key and a public key. In some embodiments, each administrative node will store both keys and send a copy of its own public key to each other administrative node in the network (or alternatively, each administrative node's public key is published for all the administrative nodes). Each time an administrative node sends a message (e.g., a proposal regarding how a resource request should be handled), the message may be cryptographically signed using that node's own private key and then sent out to other administrative nodes in the network. The administrative nodes that receive the cryptographically signed message may use the identifying information associated with the sender administrative node to look up the sender administrative node's public key to verify the cryptographically signed message. If cryptographic signature verification of the message is successful using the node's public key, then the message can be authenticated as a message that was sent from that administrative node. In this way, the cryptographically signed message can be thought of as verification information associated with the sender administrative node that can be verified based on the sender node's public key. Otherwise, if the cryptographic signature verification of the message is not successful using the node's public key, then the message cannot be authenticated as a message that was sent from that administrative node and the message may be processed accordingly (e.g., if the message were a proposal regarding how a resource request should be handled, then the proposal would be ignored).

At 506, a set of resources to be managed by the administrative node network is authenticated. In some embodiments, an administrative node is authenticated by systems that form or otherwise provide resources that are to be managed by the administrative node network through the submission of administrative credentials and/or the establishing administrator rights with a cryptographic approach. Furthermore, in some embodiments, each exchange between an administrative node and a resource system may be encrypted with proper security keys and/or signed with cryptographic signature for security and authentication purpose at the recipient.

At 508, a root record based at least in part on current resource state information associated with the set of resources is created. The first record that is generated at an administrative node is referred to as the "root record." The root record documents the initial state (e.g., availability, settings, or other initial attributes) of the set of resources that is managed by the administrative node network. If the joining node is not the first to join the administrative node network, it may simply copy the original root record. If multiple nodes join simultaneously during the initiation process, the root record is the same across these initial nodes such as through an initialization consensus procedure.

Figure 6:
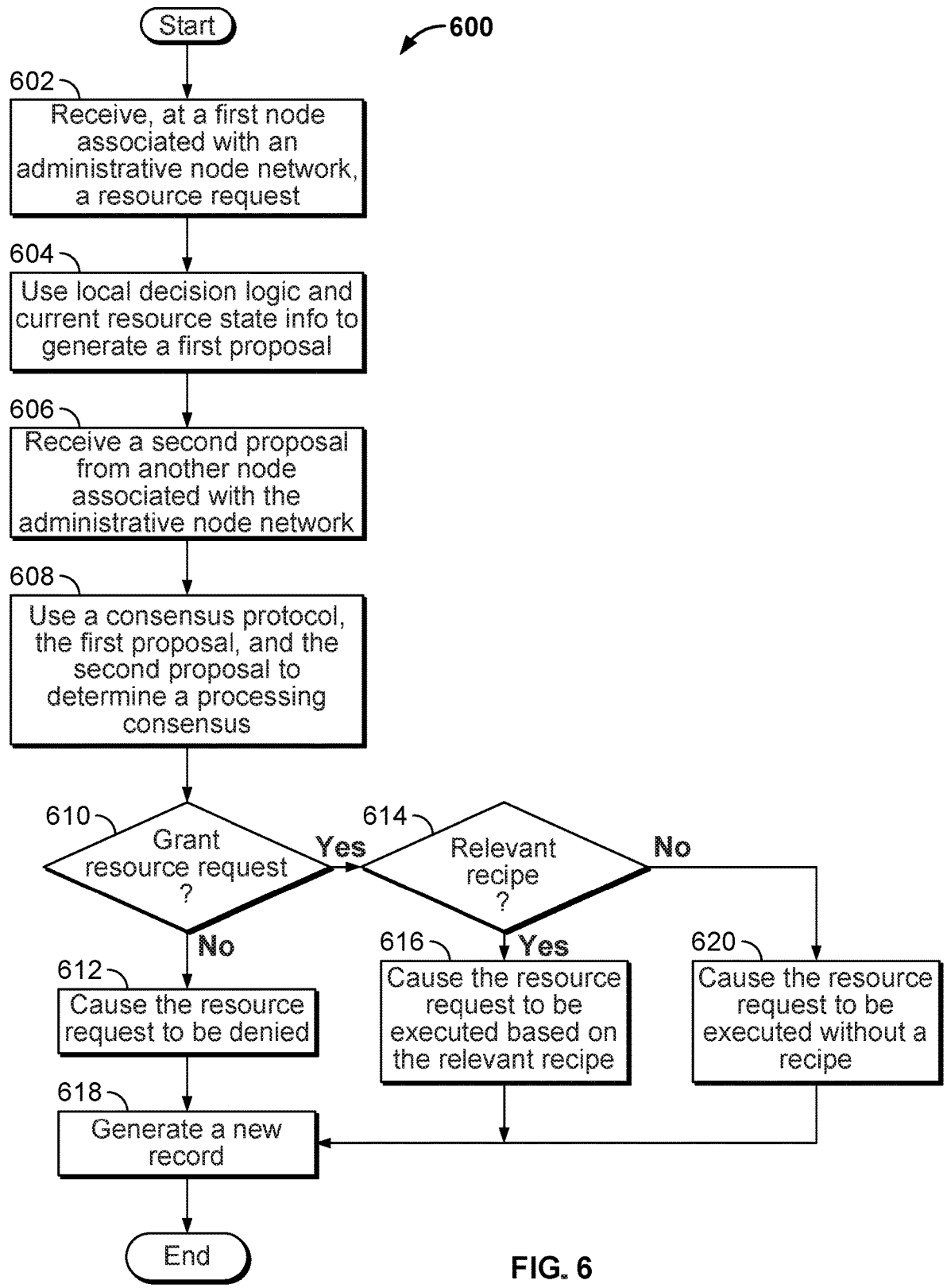
FIG. 6 is a flow diagram showing an example of a process for processing a resource request.

FIG. 6 is a flow diagram showing an example of a process for processing a resource request. In some embodiments, process 600 is implemented at each of one or more of the administrative nodes (e.g., administrative node 204, administrative node 206, and administrative node 208) of administrative node network 210 of FIG. 2. In some embodiments, process 400 of FIG. 4 may be implemented, at least in part, by process 600.

At 602, a resource request is received at a first node associated with an administrative node network. The resource request, that seeks to use or perform action(s) at a set of resources that is managed by the administrative node network, is received at an administrative node. For example, the resource request may have been sent directly from the requestor to the administrative node, the resource request may have been sent to another administrative node in the same administrative node network and then forwarded to the administrative node, or the resource request was first sent to a website associated with the administrative node network and subsequently forwarded to each administrative node that is participating in processing the resource request.

At 604, local decision logic and current resource state information are used to generate a first proposal. The administrative node applies its locally stored decision logic to at least the current resource state information associated with the managed set of resources to generate a proposal with respect to how the resource request is to be handled. In addition to the current resource state information associated with the managed set of resources, other example factors that the decision logic may use to the generate the proposal include historical resource requests that have been made by the same requestor that had sent the current resource request, an existing (e.g., smart) contract between the requestor and a party operating a requested resource, other concurrent resource request(s) that are being processed by the same administrative node network, and an amount of credits or funds that is associated with the requestor. The proposal may indicate, for example, whether to grant the resource request and if so, how to service the resource request.

For example, if the administrative node receives a resource request from Requestor A to receive a virtual machine implemented firewall network service, the decision logic that is used by the administrative node may consider factors such as, for example, how many virtual machines of the managed resources are available to implement a firewall service, how many virtual machine implemented network resources Requestor A has previously used, a smart contract between the Requestor A and the party that provisions the virtual machines, and revenue disparities between allocating the same virtual machine to a competing resource request from Requestor B.

At 606, a second proposal is received from another node associated with the administrative node network. A proposal is received from each other administrative node that is also participating in handling the resource request.

Steps 604 and 606 may happen at least partially concurrently as the administrative node may generate its own proposal for a resource request and independently, receive proposal for the resource request from other nodes.

At 608, a consensus protocol, the first proposal, and the second proposal are used to determine a processing consensus. The locally generated proposal is evaluated with along with the proposals received from other nodes and a processing consensus is determined using the consensus protocol that is applicable to the resource request. For example, the consensus protocol may select one proposal of the multiple proposals to use as the processing consensus. In another example, the consensus protocol may derive a processing consensus from the proposals that is not identical to any particular proposal.

At 610, it is determined whether the processing consensus indicates to grant the resource request. In the event that the processing consensus indicates to grant the resource request, control is transferred to 614. Otherwise, in the event that the processing consensus indicates to deny the resource request, control is transferred to 612.

At 612, the resource request is caused to be denied. If the processing consensus indicates to deny the resource request, then, for example, a message associated with the denial may be sent to the requestor.

At 614, it is determined whether a relevant recipe exists. In the event that a relevant recipe exists for the resource request, control is transferred to 616. Otherwise, in the event that a relevant recipe does not exist for the resource request, control is transferred to 620.

At 616, the resource request is caused to be executed based on the relevant recipe. Recipes for executing resource requests may be pre-registered at the administrative node. A resource request may be matched against the pre-registered recipes to determine a matching recipe, if one exists, based on predefined mappings between resource requests and recipes. As mentioned above, a recipe comprises a codified execution of a resource request. A recipe may dictate of a series of steps to be performed and also zero or more corresponding scripts to be executed at each step. In some embodiments, an administrative node may execute the recipe or another entity may execute the recipe. In some embodiments, the processing consensus or the relevant recipe may dictate which entity is to execute the recipe. In some embodiments, a recipe requires limited access/privilege to one or more control systems. In some embodiments, to enable limited access to one or more control systems, identifying information associated with the sender and verification information (e.g., a signature or a hash that is generated using a key corresponding to the limited access/privilege) that is associated with the limited access/privilege may be included in the resource request, as will be described in further detail below.

At 618, a new record is generated. A new record that at least documents the resource request and the processing consensus is generated. The record may describe what the resource request was and whether it was granted and if the request was granted, what changes or actions were performed on the managed set of resources, and/or the updated current state associated with the managed set of resources after the request was executed. In some embodiments, the new record is linked to the immediately previous record.

At 620, the resource request is caused to be executed without a recipe. The resource request is executed without a recipe. For example, a resource request that requests for a simple action may be performed without a recipe.

Figure 7:
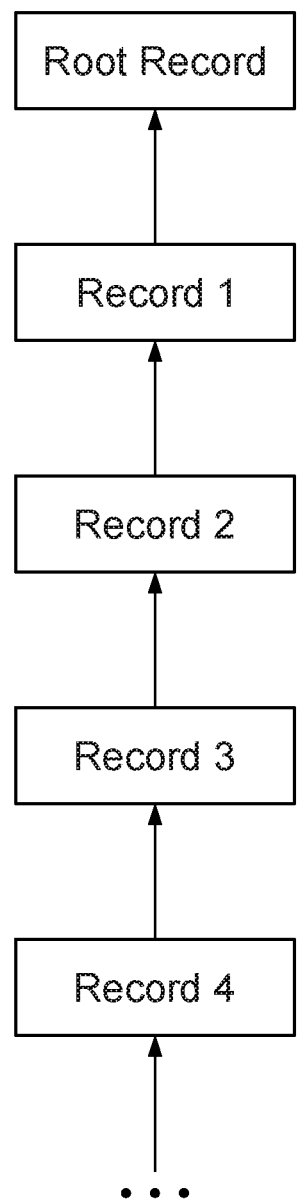
FIG. 7 is a diagram showing a series of records associated with processed resource requests in an administrative node network.

FIG. 7 is a diagram showing a series of records associated with processed resource requests in an administrative node network. Each administrative node or a subset of administrative nodes in an administrative node network may store a series of records, where each record documents a resource request that has been processed by the node network. For example, an administrative node may store the five example records of FIG. 7, each linked to a previously record through to the root record that was established when the administrative node network was established. In some embodiments, the most recently generated record in the series is used to generate a proposal for each new resource request that is received at the administrative node. In some embodiments, whenever a new administrative node joins the administrative node network, a copy of the most recently generated record is sent to the new administrative node so that it can use that record to generate a proposal for the next resource request. In some embodiments, the series of records such as those shown in FIG. 7 may be used as an audit trail for the administrative node network.

Figure 8:
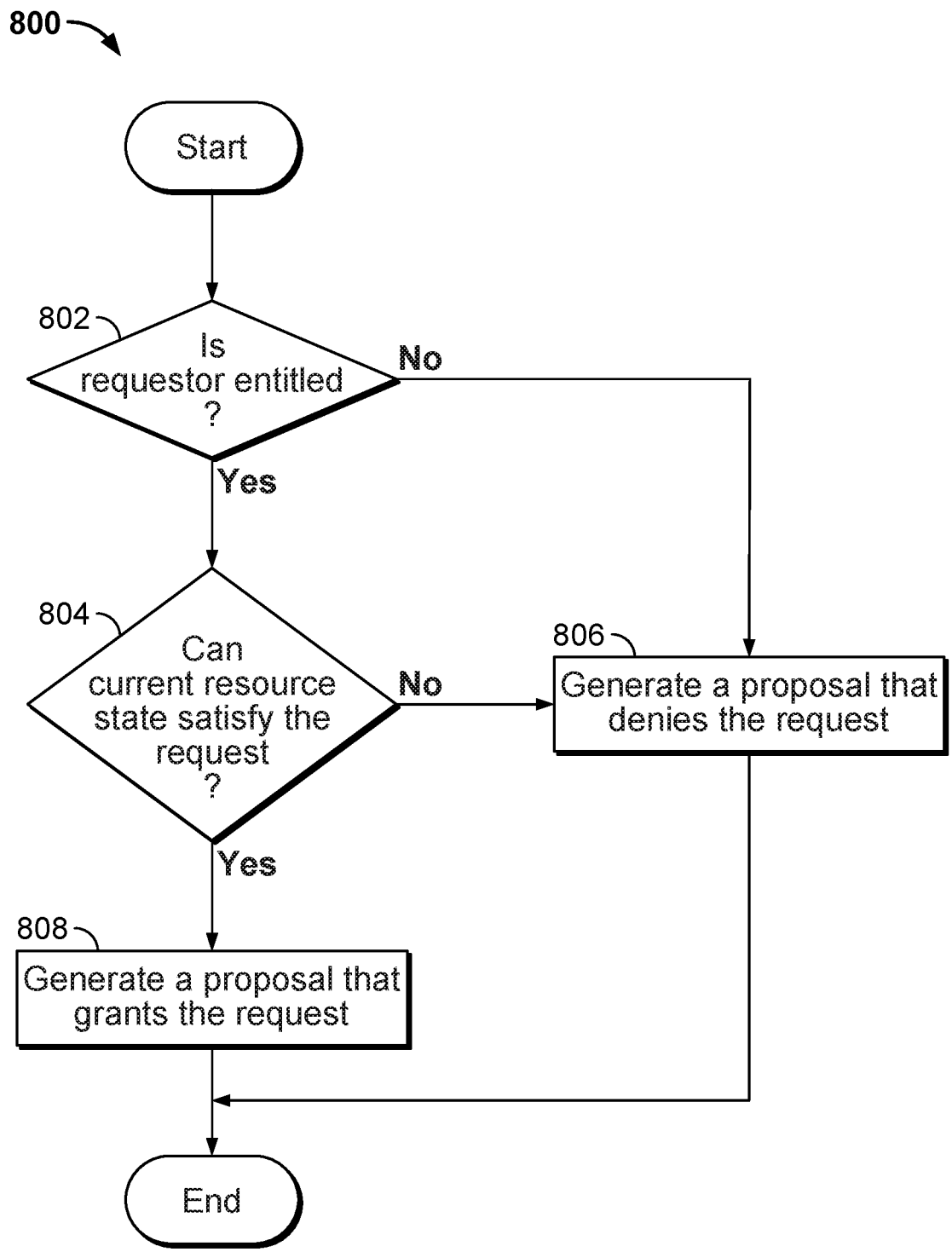
FIG. 8 is a flow diagram showing an example of a process for generating a proposal.

FIG. 8 is a flow diagram showing an example of a process for generating a proposal. In some embodiments, process 800 is implemented at each of one or more of the administrative nodes (e.g., administrative node 204, administrative node 206, and administrative node 208) of administrative node network 210 of FIG. 2. In some embodiments, step 604 of process 600 of FIG. 6 may be implemented, at least in part, by process 800.

Process 800 is an example process that shows a two-part determination that an administrative node performs in generating a proposal for a resource report.

At 802, it is determined whether a requestor is entitled to have a resource request granted. In the event that the requestor is entitled, control is transferred to 804. Otherwise, in the event that the requestor is not entitled, control is transferred to 806. In the first part of the determination, it is determined whether the requestor from which the resource request had originated is entitled to have the resource request granted. In some embodiments, whether the requestor is entitled to have the resource request granted is determined based on whether the requestor has the rights/credits that are needed to complete the request. For example, whether the requestor has the rights/credits that are needed to complete the request is determined based on a smart contract between the requestor and a party that operates the resources, a license obtained by the requestor, and/or whether credits that belong to the requestor are sufficient to perform the request.

At 806, a proposal that denies the resource request is generated. If it is determined that the requestor does not have the rights/credits that are needed to complete the resource request, then the administrative node generates a proposal that indicates to deny the resource request.

At 804, is it determined whether a current resource state satisfy the request. In the event that the current resource state can satisfy the request, control is transferred to 808. Otherwise, if the current resource state cannot satisfy the request, control is transferred to 806. If the requestor is determined to have the rights/credits that are needed to complete the resource request, the second part of the determination determines whether the resource request can be satisfied given the current availability of the set of resources that is managed by the administrative node network. For example, this second part of the determination may determine if the requested units of a particular resource is less than the available units of that resource. In some embodiments, this second part of the determination also considers whether it is more beneficial (e.g., generates greater revenue for the resource owner) if the resource request in question is executed or if a competing, concurrent resource request for the same resources is satisfied (assuming that both requests cannot be satisfied).

At 808, a proposal that grants the resource request is generated. If there are sufficient resources to satisfy the resource request, then a proposal that includes a proposed execution of the request is generated by the administrative node using the decision logic that is locally stored at the node.

Figure 9:
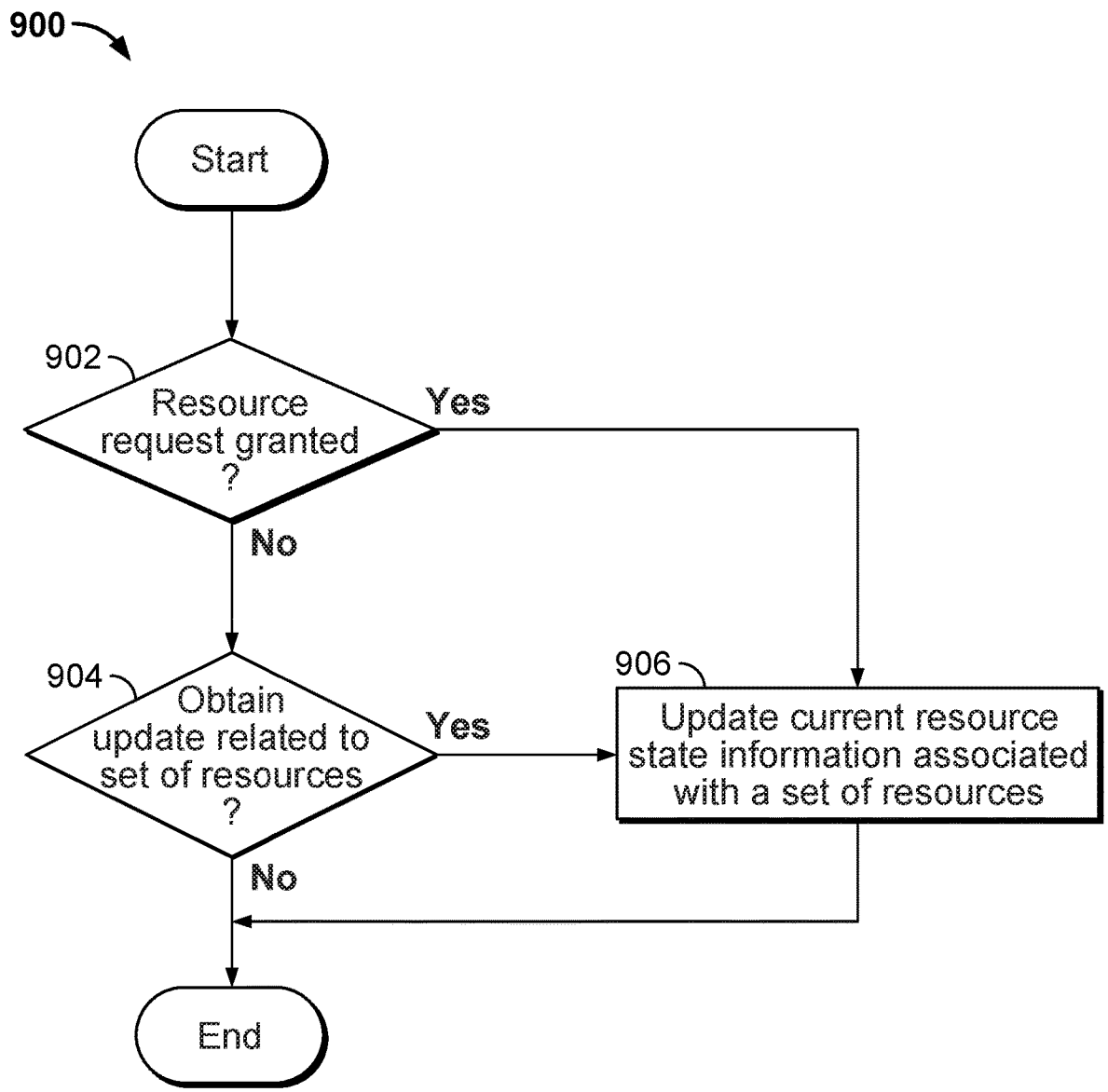
FIG. 9 is a diagram showing an example of a process for updating the current resource state information that is maintained at an administrative node.

FIG. 9 is a flow diagram showing an example of a process for updating the current resource state information that is maintained at an administrative node. In some embodiments, process 900 is implemented at each of one or more of the administrative nodes (e.g., administrative node 204, administrative node 206, and administrative node 208) of administrative node network 210 of FIG. 2.

Process 900 is an example process for maintaining an up-to-date version of the current resource state information associated with a set of resources that is managed by an administrative node network. As will be shown below, the current resource state information associated with the set of resources may be updated directly after a resource request is granted/executed or when an update related to the set of resources is obtained irrespective of a resource request.

At 902, it is determined whether a resource request is granted. In the event that a resource request is granted, control is transferred to 906. Otherwise, in the event that a resource request is not granted, control is transferred to 904. In the event that the resource request is granted and executed, the state of the set of resources becomes affected and is correspondingly updated at step 906. For example, after a resource request is updated, the amount of availability associated with the set of resources is reduced and/or other settings or properties associated with the set of resources are affected.

At 904, is determined whether an update related to a set of resources is obtained. In the event that an update related to a set of resources is obtained, control is transferred to 906. Otherwise, in the event that an update related to a set of resources is not obtained, process 900 ends. Separate from resource requests, the administrative node may receive updates from the set of resources regarding changes that had occurred to the resources (e.g., new resources are added to the managed set) or query the set of resources for changes.

At 906, current resource state information associated with a set of resources is updated.

FIG. 10 is a diagram showing an example table of mapping each user to a role in an application and a corresponding set of accesses associated with that role. For each of the applications, there could be different access/actions/system privileges within each application. Traditionally, these privileges are bundled into specific roles for the corresponding application. For the example, the application may have an application administrator role, some roles based on data read access and write access, and all kinds of varying layers. Sometimes, roles can be programmed from within the application. Conventionally, a user will have their user credentials/access privileges tied to specific roles for each specific application. This user role-based approach is commonly used by complicated Enterprise Resource Planning (ERP) systems, which requires lots of roles and compliances, and also modern day applications with applications administrators and user groups with shared access to granted resources.

However, such a role-based access scheme can be inflexible. Taking the example of User 1, User 1 can presumably enjoy wide access in Application 2 for having the Admin Role for Application 2 yet have no access to Application 3, even if the user only needed to perform a single action with respect to Application 3. Also, for example, if User 1 needed to perform an action with respect to Application 1 for which he or she does not have access privilege to do so within the scope of the Role 1 and Role 3, then a new role that grants such an access privilege may need to be especially created and assigned to User 1, which may be inefficient. In some embodiments of autonomous management of resources by an administrative node network, instead of tying access privileges to application roles, access privileges may instead be associated with particular keys and/or particular recipes. In some embodiments, pre-registered recipes for taking system actions (needed to execute resource requests) are established, the access privileges required for the application(s) are determined, and trusts are established between the registered recipes and the applications. As part of managing systems, the users/requestors can be granted recipes access/update/execution rights, which may span across multiple application roles. For example, to allow a user/requestor to be able to migrate a system to its new destination, it may take multiple administrative rights on network systems, compute systems, application systems, data systems, etc. to execute complicated scenarios. As part of provisioning, users/requestors can be granted rights to trigger different parts of the registered recipes, such as through key-based cryptography signature. This can make it easy to handle complicated system management without compromising role-based access rights, as most companies need separated control for each of these roles per compliance and security reasons.

FIG. 11 is a diagram showing an example table of mapping each user to a particular key to be used in each application, where each key is associated with a limited set of access privileges. In some embodiments, keys exchange and verifications may be implemented in a highly modular manner. In some embodiments, users/requestors can also have master keys and other mechanisms to encrypt and/or sign their resource request in addition to using a required recipe key. Also, while in the example of FIG. 11, the recipe-based approach is built based on role-based privileges, it can be implemented in alternative ways such as direct management code or through a proxy system for managing related systems. While the example of FIG. 11 discusses a single application scenario, it can also be further extended into multiple application management and other cross-applications/cross-system scenarios.

In various embodiments, a global registry of role credentials is established or alternatively, a cryptographic approach to establish role-based access is used in a flexible way. For example, if there are pre-registered recipes for system administrations, these recipes can be mapped to authorized keys for specific executions. In some embodiments, the concept of role-based access can be normalized to a set of keys mapped to a set of allowed executions in such scenario. This is quite different from the traditional software style of role-based access, in which users are categorized into pre-defined roles with pre-defined execution rights. By taking a flat structure of key-mapped execution rights, users are no longer the central pieces to role-based access control. Instead, owners of the right keys, with optional chaining signatures and rights to other relevant keys, are in the position of validating the proper access rights based on the cryptographic proof as an alternative.

For example, verification information (e.g., a signature or a hash) that is generated based on a key that is associated with a limited set of access privileges across one or more control systems can be provided by a requestor along with identifying information associated with the requestor in a resource request that is sent to an administrative node network. For example, the key that is associated with a limited set of access privileges across one or more control systems may be a key that is associated with the requestor. If the resource request is determined to be granted according to a processing consensus, then a recipe that is relevant to the request is looked up. In the execution of the recipe, the verification information that was provided in the resource request is used by (e.g., the scripts that are included in) the recipe to access each of one or more systems that are needed to satisfy the resource request. For example, a system to which access is needed to perform the recipe may use the identifying information that was included in the resource request to identify a public key associated with the requestor and then use the public key to validate the verification information (e.g., signature). If the verification information can be validated based on the public key, then the system grants access to the recipe. In some embodiments, the private and/or public keys that are to be used with a certain recipe may have been generated by the party that had generated the recipe.

The following is a specific example of a key-mapped access: A resource request to set up a website with the domain name "ABC" in North America is received at an administrative node network. The resource request includes identifying information (e.g., associated with the requestor) and also verification information (e.g., that is generated using a private key assigned to the requestor). After the administrative node network generates a processing consensus that indicates to grant and execute the request, the node network looks up a relevant recipe to execute the request. The recipe defines the following five steps, below, and also corresponding systems for which the identifying information and also verification information that were provided in the resource request map to limited access for the purposes of executing the recipe:

1) Perform setup of the "ABC" domain name (e.g., www.ABC.com). The identifying information and also verification information from the resource request are used to verify that the requestor that had sent the resource requestor is the administrator of the "ABC" domain.

2) Set up a web server associated with the website. The identifying information and also verification information from the resource request are used to provide computing resource rights needed to set up the web server.

3) Set up a database on the web server. The identifying information and also verification information from the resource request are used to obtain access to a database.

4) Set up a network and a firewall on the web server for the domain.

5) Update records for the domain, the network, the database, and the web server to reflect the setting up of the new "www.ABC.com" website. The identifying information and also verification information from the resource request are used to obtain access to such records.

As described herein, a network of administrative nodes may work in concert to provide management of resources with high integrity. Moreover, cryptography may be used to sign communications among the administrative nodes and also between the administrative nodes and other systems (e.g., resource systems, requestors) to ensure trust and security. Furthermore, access privileges for executing a resource request that is granted by the administrative node network may be flexibly assigned to allow for better customization between the execution of the request and its corresponding needed accesses.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A first node of a plurality of nodes associated with an administrative node network, comprising:
   a processor configured to:
      receive a resource request directed to the administrative node network, wherein the administrative node network is associated with managing a set of resources;
      generate a first proposal with respect to the resource request using a first set of decision logic and a most recently generated record wherein the first proposal comprises a first processing of the resource request, wherein the most recently generated record describes one or more of the following: whether a previous resource request was granted, a change to the set of resources with respect to the previous resource request, and an updated current state associated with the set of resources with respect to the previous resource request;
      obtain a second proposal with respect to the resource request from a second node of the plurality of nodes associated with the administrative node network, wherein the second proposal is generated independently of the first proposal and using a second set of decision logic, wherein the first set of decision logic is different from the second set of decision logic;

determine a processing consensus associated with the resource request based at least in part on the first proposal and the second proposal;

determine a relevant recipe associated with the resource request, wherein the resource request comprises identifying information and verification information, wherein the verification information is generated based on a recipe key, wherein the recipe key corresponds to a limited set of rights to access one or more systems associated with an execution of the relevant recipe; and cause the resource request to be executed based at least in part on the relevant recipe, the identifying information, and the verification information, wherein the verification information included in the resource request is validated by a system to which access is requested by the relevant recipe; and a memory coupled to the processor and configured to provide the processor with instructions.

2. The first node of claim 1, wherein the identifying information comprises a first identifying information, wherein the verification information comprises a first verification information, and wherein the processor is further configured to:

receive configuration information associated with implementing administrative services as part of the administrative node network; and receive a second identifying information and a second verification information from the second node.

3. The first node of claim 1, wherein the processor is further configured to authenticate the set of resources.

4. The first node of claim 1, wherein to generate the first proposal with respect to the resource request comprises to:

determine whether a requestor associated with the resource request is entitled to have the resource request be granted; and in response to a determination that the requestor associated with the resource request is entitled to have the resource request be granted, determine whether the resource request can be satisfied based at least in part on current resource state information associated with the set of resources.

5. The first node of claim 4, wherein the processor is further configured to:

in response to a determination that the resource request can be satisfied based at least in part on the current resource state information associated with the set of resources, determine whether the relevant recipe is associated with the resource request; and in response to a determination that the relevant recipe is associated with the resource request, cause the resource request to be executed based at least in part on the relevant recipe.

6. The first node of claim 1, wherein the processor is further configured to generate a new record based at least in part on the resource request and the processing consensus.

7. The first node of claim 1, wherein the processor is further configured to:

cause the resource request to be executed; and update current resource state information associated with the set of resources based at least in part on the execution of the resource request.

8. The first node of claim 1, wherein the processor is further configured to:

receive an update to the set of resources; and modify current resource state information associated with the set of resources based at least in part on the update.

9. The first node of claim 1, wherein the plurality of nodes associated with the administrative node network comprises a distributed plurality of nodes without a master node.

10. The first node of claim 1, wherein the verification information is generated using a private key associated with a requestor associated with the resource request, and wherein the verification information included in the resource request is validated by the system using the identifying information included in the resource request to identify a public key associated with the requestor and using the public key to validate the verification information.

11. The first node of claim 1, wherein the processor is further configured to:

determine that a new node has joined the administrative node network; and send a copy of the most recently generated record to the new node, wherein the new node is configured to use at least the copy of the most recently generated record to generate a third proposal with respect to the resource request, wherein the processing consensus associated with the resource request is further determined based at least in part on the third proposal.

12. The first node of claim 1, wherein the most recently generated record is linked to a previously generated record, and wherein a series of records comprising the most recently generated record and the previously generated record is stored by the first node.

13. A method, comprising:

receiving, at a first node of a plurality of nodes associated with an administrative node network, a resource request directed to the administrative node network, wherein the administrative node network is associated with managing a set of resources;

generating a first proposal with respect to the resource request using a first set of decision logic and a most recently generated record wherein the first proposal comprises a first processing of the resource request, wherein the most recently generated record describes one or more of the following: whether a previous resource request was granted, a change to the set of resources with respect to the previous resource request, and an updated current state associated with the set of resources with respect to the previous resource request;

obtaining a second proposal with respect to the resource request from a second node of the plurality of nodes associated with the administrative node network, wherein the second proposal is generated independently of the first proposal and using a second set of decision logic, wherein the first set of decision logic is different from the second set of decision logic;

determining a processing consensus associated with the resource request based at least in part on the first proposal and the second proposal;

determining a relevant recipe associated with the resource request, wherein the resource request comprises identifying information and verification information, wherein the verification information is generated based on a recipe key, wherein the recipe key corresponds to a limited set of rights to access one or more systems associated with an execution of the relevant recipe; and causing the resource request to be executed based at least in part on the relevant recipe, the identifying information, and the verification information, wherein the verification information included in the resource request is validated by a system to which access is requested by the relevant recipe.

14. The method of claim 13, wherein the identifying information comprises a first identifying information, wherein the verification information comprises a first verification information, and further comprising:
receiving configuration information associated with implementing administrative services as part of the administrative node network; and
receiving a second identifying information and a second verification information from the second node.

15. The method of claim 13, further comprising authenticating the set of resources.

16. The method of claim 13, further comprising generating the first proposal with respect to the resource request comprises:
determining whether a requestor associated with the resource request is entitled to have the resource request be granted; and
in response to a determination that the requestor associated with the resource request is entitled to have the resource request be granted, determining whether the resource request can be satisfied based at least in part on current resource state information associated with the set of resources.

17. The method of claim 16, further comprising:
in response to a determination that the resource request can be satisfied based at least in part on the current resource state information associated with the set of resources, determining whether the relevant recipe is associated with the resource request; and
in response to a determination that the relevant recipe is associated with the resource request, causing the resource request to be executed based at least in part on the relevant recipe.

18. The method of claim 13, further comprising generating a new record based at least in part on the resource request and the processing consensus.

19. The method of claim 13, wherein the plurality of nodes associated with the administrative node network comprises a distributed plurality of nodes without a master node.

20. A computer program product, the computer program product being embodied in a non-transitory computer readable storage medium and comprising computer instructions for:
receiving, at a first node of a plurality of nodes associated with an administrative node network, a resource request directed to the administrative node network, wherein the administrative node network is associated with managing a set of resources;
generating a first proposal with respect to the resource request using a first set of decision logic and a most recently generated record wherein the first proposal comprises a first processing of the resource request, wherein the most recently generated record describes one or more of the following: whether a previous resource request was granted, a change to the set of resources with respect to the previous resource request, and an updated current state associated with the set of resources with respect to the previous resource request;
obtaining a second proposal with respect to the resource request from a second node of the plurality of nodes associated with the administrative node network, wherein the second proposal is generated independently of the first proposal and using a second set of decision logic, wherein the first set of decision logic is different from the second set of decision logic;
determining a processing consensus associated with the resource request based at least in part on the first proposal and the second proposal;
determining a relevant recipe associated with the resource request, wherein the resource request comprises identifying information and verification information, wherein the verification information is generated based on a recipe key, wherein the recipe key corresponds to a limited set of rights to access one or more systems associated with an execution of the relevant recipe; and
causing the resource request to be executed based at least in part on the relevant recipe, the identifying information, and the verification information, wherein the verification information included in the resource request is validated by a system to which access is requested by the relevant recipe.

* * * * *

UNITED STATES PATENT AND TRADEMARK OFFICE
CERTIFICATE OF CORRECTION

PATENT NO. : 11,683,213 B2
APPLICATION NO. : 16/397844
DATED : June 20, 2023
INVENTOR(S) : Chris Lin Page 1 of 1

It is certified that error appears in the above-identified patent and that said Letters Patent is hereby corrected as shown below:

In the Specification

In Column 4, Line(s) 32, after "nodes", delete "and".

In Column 10, Line(s) 34, after "stored", insert --at--.

In Column 10, Line(s) 43, after "respect", insert --to--.

In Column 15, Line(s) 44, after "evaluated", delete "with".

In Column 18, Line(s) 25, after "For", delete "the".

In the Claims

In Column 22, Line(s) 41, Claim 13, after "record", insert --,--.

In Column 24, Line(s) 12, Claim 20, after "record", insert --,--.

Signed and Sealed this
Seventh Day of November, 2023

Katherine Kelly Vidal
*Director of the United States Patent and Trademark Office*